United States Patent [19]
Kawamura et al.

[11] Patent Number: 5,233,248
[45] Date of Patent: Aug. 3, 1993

[54] HEAT RESISTANT AND EXPLOSION-PROOF TYPE PERMANENT MAGNETIC SYNCHRONOUS MOTOR

[75] Inventors: Mitsuhiro Kawamura, Tokyo; Wataru Bitoh, Hyogo; Akira Yamada, Nagasaki; Syo Imayoshi, Saitama, all of Japan

[73] Assignee: Mitsubishi Denki Kabushiki Kaisha, Tokyo, Japan

[21] Appl. No.: 885,690

[22] Filed: May 19, 1992

[30] Foreign Application Priority Data

Jul. 10, 1991 [JP] Japan .................. 3-169516

[51] Int. Cl.⁵ ............................................. H02K 5/10
[52] U.S. Cl. ........................................ 310/88; 310/89; 310/261
[58] Field of Search ................... 310/85, 88, 87, 89, 310/156, 261

[56] References Cited

U.S. PATENT DOCUMENTS

| | | | |
|---|---|---|---|
| 3,215,083 | 11/1965 | Sarles et al. | 310/88 |
| 4,492,884 | 1/1985 | Asano et al. | 310/88 |
| 4,832,899 | 5/1989 | Wilson et al. | 376/209 |
| 4,963,780 | 10/1990 | Hochstrasser | 310/88 |
| 5,091,668 | 2/1992 | Cuenot et al. | 310/156 |

FOREIGN PATENT DOCUMENTS

| | | | |
|---|---|---|---|
| 59-8430 | 3/1984 | Japan | 310/85 |
| 59-149451 | 10/1984 | Japan | 310/85 |
| 62-122442 | 8/1987 | Japan | 310/85 |
| 1-76174 | 5/1989 | Japan | 310/85 |

*Primary Examiner*—Steven L. Stephan
*Assistant Examiner*—Matthew Nguyen
*Attorney, Agent, or Firm*—Burns, Doane, Swecker & Mathis

[57] ABSTRACT

A heat resistant and explosion-proof permanent magnetic synchronous motor having a stator which includes an armature iron core made by piling up steel plates with surface covered with a mineral insulation material and disposed on an inner peripheral surface of a pressure case, an armature coil made by winding a wire covered with a mineral insulation material around a slot of the armature iron core, a can hermetically sealing the armature iron core, a back-up sleeve supporting the can at a portion where the armature iron core is not provided, and a slot piece of a mineral insulation material supporting the can at an opening portion of the slot. The motor also includes a rotor including a magnetic yoke connected to an outer peripheral surface of an actuating shaft provided to penetrate the pressure case and rotatably supported thereon, a plurality of rotor magnetic poles disposed on an outer peripheral surface of the magnetic yoke, and a non-metallic case covering an outer peripheral surface of the rotor magnetic pole.

5 Claims, 4 Drawing Sheets

HEAT RESISTANT AND EXPLOSION-PROOF TYPE PERMANENT MAGNETIC SYNCHRONOUS MOTOR

BACKGROUND OF THE INVENTION

1. Field of the Invention

The present invention relates to a heat resistant and explosion-proof type permanent magnetic synchronous motor, more particularly to a heat resistant and explosion-proof type permanent magnetic synchronous motor provided to actuate a control rod in a pressure container of nuclear reactor exposed in severe circumstances such as temperature near 330 centigrade or pressures near 100 atmospheric pressure and so on.

2. Description of the Prior Art

Conventionally, this kind of motor was installed out of the pressure container of nuclear reactor, therefore, it was not necessary to provide a motor which could endure severe circumstances such as temperature near 330 degrees centigrade or temperature near 100 times atmospheric pressure.

Furthermore, the type of motor specially made for severe circumstances by the teachings of conventional technologies was an induction motor of a canned type which would endure either high temperature and high pressure, for example as shown in Japanese Utility Model No. SHO 59-8430 or Unexamined Utility Model Application No. SHO 59-14951. In other words, there has been not known a heat resistant and explosion-proof type permanent magnetic synchronous motor capable of not only high temperature but high pressure as well.

In the case of above conventional motors, since the motors are installed out of the pressure container of nuclear reactor, they need to serve as a boundary between high pressure side of the pressure container and the low pressure side of the outside. Accordingly, if a small accident occurs in a control rod actuating apparatus driven by the motor, it is feared the pressure difference between outside and inside of the pressure container may induce a serious accident such as the control rod flying out of the pressure container. For this reason, it was required to provide a supporting structure on an upper portion of the pressure container for supporting the control rod actuating apparatus. Also, various inspectional experiments need to be done to assure operational safety under the assumption that a serious accident may occur if the control rod flies out of the pressure container.

On the other hand, if it were possible to provide the control rod actuating apparatus in the pressure container, it would not be necessary to provide a supporting structure out of the pressure container. Furthermore, a nuclear reactor can be made compact in size and light in weight, and possibility of the control rods flying out accidentally can be substantially eliminated. In improving a conventional induction motor of canned type made for special applications, the aim has to install the control rod actuating apparatus in the pressure container. In this case, the properties of induction motors make it difficult to maintain their stopping condition to hold control rods or actuate the control rods by extremely low rotational speed. This is because, in the induction motors, the secondary electric current required for a rotor to generate torque is an electric current induced by speed electromotive force. It was therefore a problem that a sufficient secondary electric current would not flow through the rotor in a stopped condition or at extremely low rotational speeds.

SUMMARY OF THE INVENTION

The present invention has been made to solve above problems. That is, the present invention is the result of an attempt to provide a heat resistant and explosion-proof type permanent magnetic synchronous motor capable of being installed in the pressure container of nuclear reactor under such severe conditions as temperatures near 330 degrees centigrade and pressure approximately 100 times atmospheric pressure.

To accomplish the above purposes, in accordance with a first aspect of the present invention, the heat resistant and explosion-proof type permanent magnetic synchronous motor comprise a stator including an armature iron core made by piling up steel plates with surfaces covered by a mineral insulation material and disposed on an inner peripheral surface of a pressure case, an armature coil by winding a wire covered by mineral insulation material around a slot of the armature iron core, a can hermetically sealing the armature iron core, a back-up sleeve supporting the can at a portion where the armature iron core is not provided, and a slot piece of mineral insulation material supporting the can at an opening portion of the slot. The motor also includes a rotor including a magnetic yoke connected to an outer peripheral surface of an actuating shaft provided to penetrate the pressure case and rotatably supported thereon, a plurality of rotor magnetic poles disposed on an outer peripheral surface of the magnetic yoke, and a non-metallic case covering an outer peripheral surface of the rotor magnetic pole.

In accordance with a second aspect of the heat resistant and explosion-proof type permanent magnetic synchronous motor of the present invention, the rotor magnetic pole is divided into a plurality of poles in an axial direction, and the rotor is constituted by disposing this divided plurality of rotor magnetic poles on the magnetic yoke on an outer peripheral surface of the magnetic yoke so as to offset with each other in a circumferential direction.

In accordance with a third aspect of the heat resistant and explosion-proof type permanent magnetic synchronous motor of the present invention, the armature iron core is made of pure steel plates with surfaces covered by ceramics through melt injection.

In accordance with a fourth aspect of the heat resistant and explosion-proof type permanent magnetic synchronous motor of the present invention, a plurality of rotor magnetic poles of the same configuration are arranged in a plurality of rows in an axial direction so as to be disposed on an outer peripheral surface, and a center ring is interposed at a portion of the armature iron core which corresponds to an intermediate portion of each of the plurality of rows.

In accordance with a fifth aspect of the heat resistant and explosion-proof type permanent magnetic synchronous motor of the present invention, the armature iron core and a component members holding this armature iron core in the pressure case are made of materials having substantially the same coefficient of linear expansion.

The above and other objects, features and advantages of the present invention will become more apparent from the following detailed description which is to be read in conjunction with the accompanying drawings. However, the accompany drawings are merely illustra-

DETAILED DESCRIPTION OF THE PREFERRED EMBODIMENT

Figure 1:
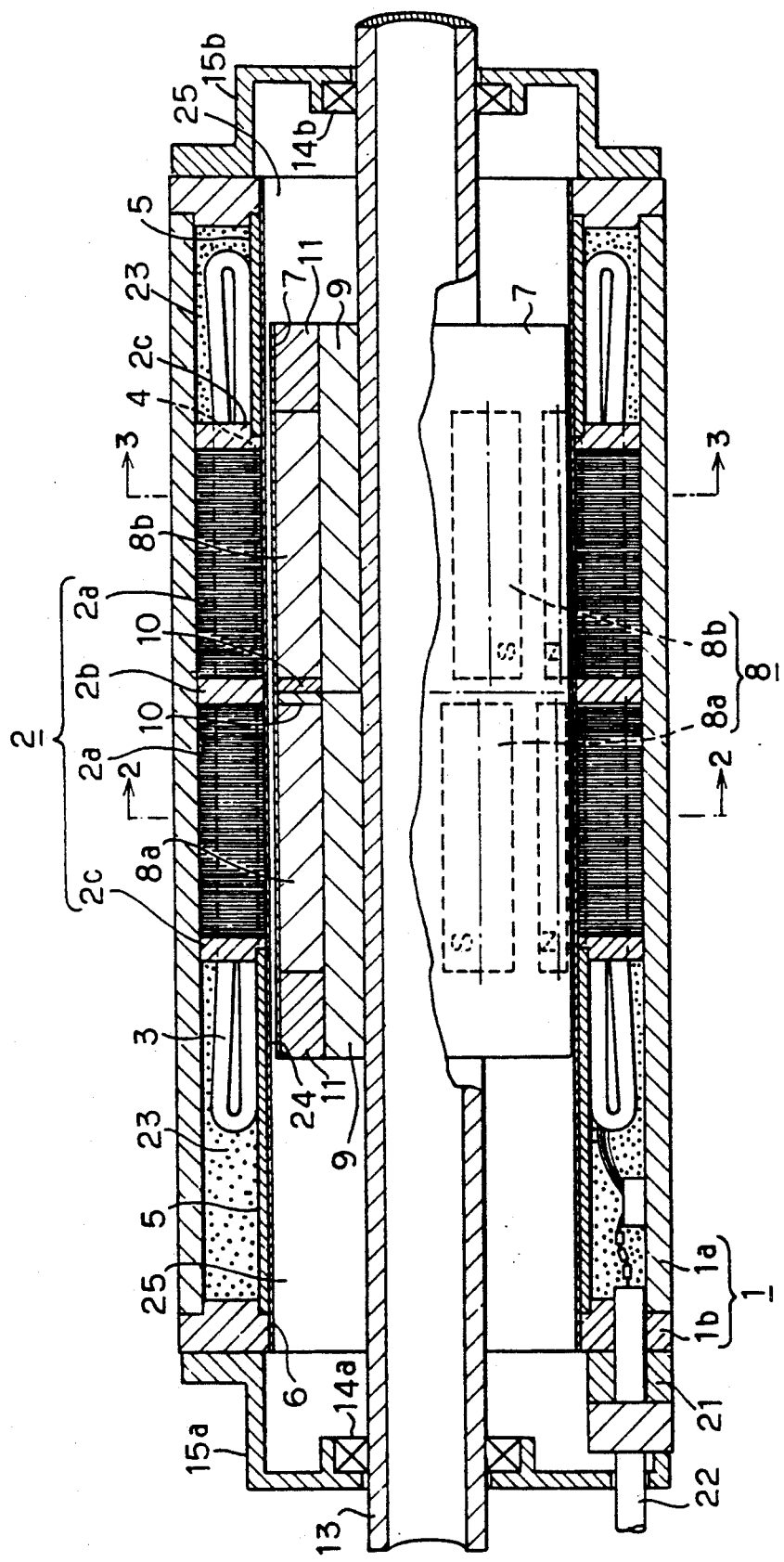
FIG. 1 is a vertical cross-sectional view showing a heat resistant and explosion-proof type permanent magnetic synchronous motor in accordance with one embodiment of the present invention.
Figure 2:
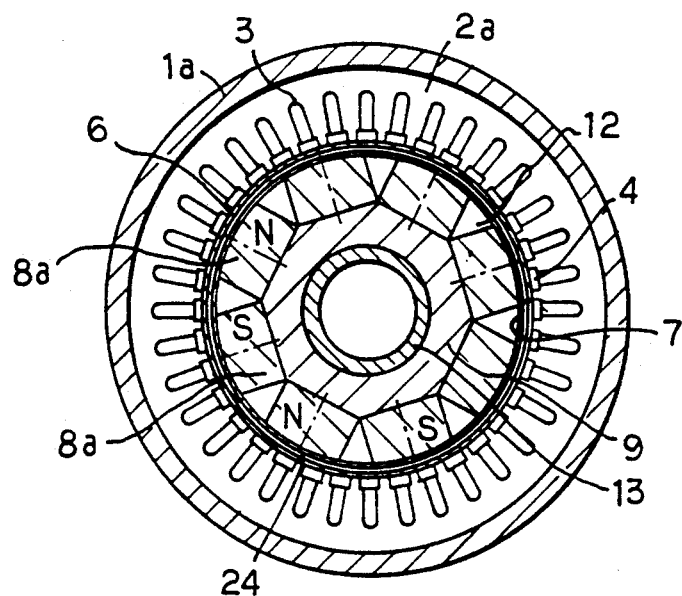
FIG. 2 is a transverse cross-sectional view taken along a line 2—2 of FIG. 1.
Figure 3:
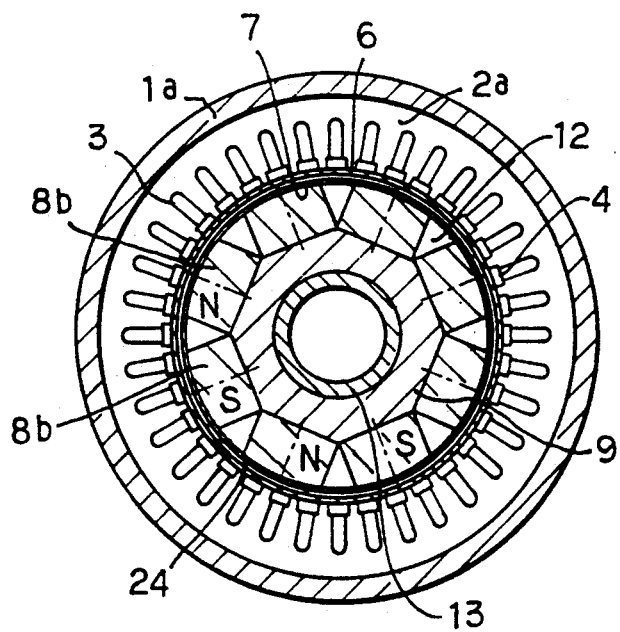
FIG. 3 is a transverse cross-sectional view taken along a line 3—3 of FIG. 1.
Figure 4:
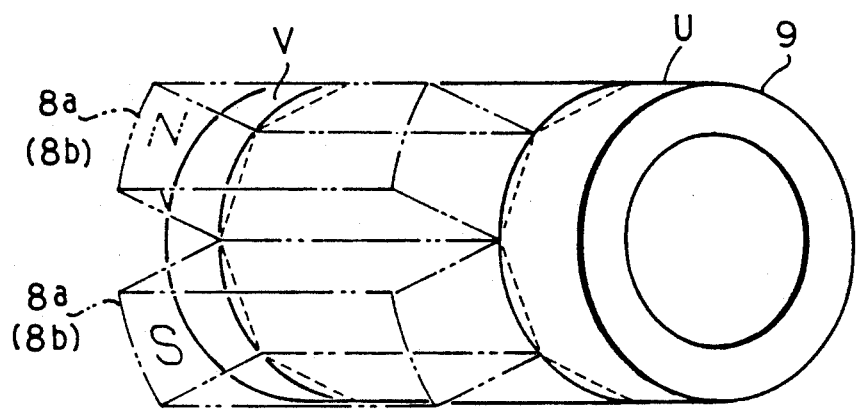
FIG. 4 is a perspective view showing a rotor magnetic yoke and part of magnetic poles of the heat resistant and explosion-proof type permanent magnetic synchronous motor in accordance with one embodiment of the present invention.
Figure 5:
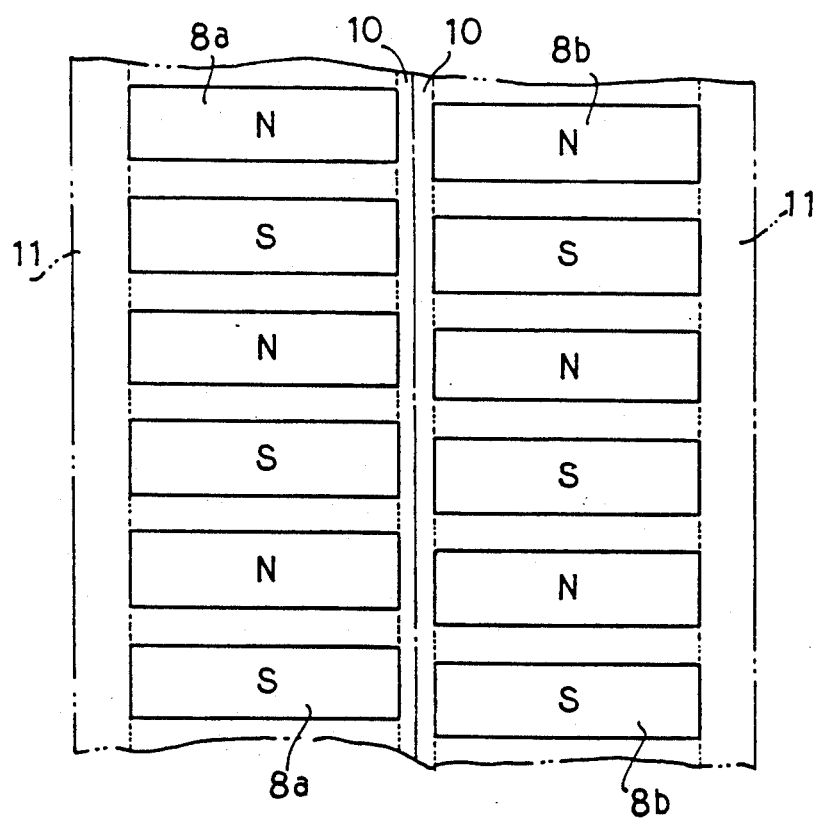
FIG. 5 is an exploded view showing the magnetic poles of the heat resistant and explosion-proof type permanent magnetic synchronous motor in accordance with one embodiment of the present invention when seen from the outside.
Figure 6:
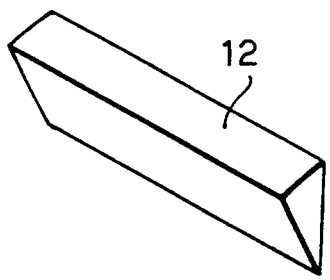
FIG. 6 is a perspective view showing a spacer of the heat resistant and explosion-proof type permanent magnetic synchronous motor in accordance with one embodiment of the present invention.

Hereinafter, referring now to the accompanying drawings, a preferred embodiment of the present invention will be explained in detail. Disclosed motor is a vertical type, and FIG. 1 is a vertical cross-sectional view. FIG. 2 is a transverse cross-sectional view taken along a line 2—2 of FIG. 1. FIG. 3 is a transverse cross-sectional view taken along a line 3—3 of FIG. 1. FIG. 4 is a perspective view showing a part of rotor. FIG. 5 is an exploded view of the rotor FIG. 6 is a perspective view showing a spacer.

In FIGS. 1-6, a reference number 1 denotes a pressure case of stator consisting of a frame 1a and a side plate 1b. A reference numeral 2 denotes an armature iron core, and a reference numeral 2a denotes piled-up iron cores provided slots constituting the armature iron core 2. A reference numeral 2b denotes a center ring made of high nickel alloy and so on inserted between the piled-up iron cores as a stiffener element. Reference 2c refers to clampers provided at ends of the piled-up iron cores as stiffener elements. A reference numeral 3 denotes an armature coil. A reference numeral 4 denotes a slot piece covering an opening of empty space of the slot in the armature iron core 2.

Further, a reference numeral 5 denotes a cylindrical back-up sleeve supported by the clampers 2c, 2d and the side plate 1b of the pressure case 1. A reference numeral 6 denotes a cylindrical can hermetically sealing the armature iron core 2 disposed on the inner peripheral surface of the pressure case 1. A reference numeral 13 denotes a rotational shaft serving as a hollow actuating shaft, which is provided to penetrate the pressure case 1 and rotatably supported thereon. A reference numeral 14a denotes an upper bearing, and a reference numeral 14b denotes a lower bearing. Reference numerals 15a, 15b denote brackets supporting there bearings 14a, 14b. A reference numeral 9 denotes a magnetic yoke. A reference numeral 8a denotes an upper magnetic pole of a permanent magnet 8, and a reference numeral 8b denotes a lower magnetic pole of the permanent magnet 8.

A reference numeral 10 denotes a side plate provided between the magnetic poles 8a and 8b. A reference numeral 11 denotes a side plate provided at an upper and lower ends of the rotor magnetic poles. A reference numeral 12 denotes a spacer made of non-magnetic material filling empty space between rotor magnetic poles. A reference numeral 7 denotes a water-proof cylindrical case to protect the surface of the rotor magnetic poles.

A portion installed with the magnetic pole 8a (8b) on outer peripheral surface of the magnetic yoke 9 is formed to be an octagonal column with an inner peripheral surface opened a hole into which the rotational shaft 13 is inserted. The surface to be fixed to the magnetic yoke 9 is a plane surface, and the outer peripheral surface is made in a cylindrical shape so as to be fixed to the pressure case.

The rotor consists of a rotor portion comprising the magnetic yoke 9 and the magnetic pole 8a and a rotor portion comprising the magnetic yoke 9 and the magnetic pole 8b, as shown in FIG. 4. Each rotor is disposed to face opposite direction in an axial direction (i.e. a portion indicated by a reference numeral u points outward and a portion indicated by a reference numeral v point inward), and coupled with the rotational shaft so as to offset a little bit angle in a circumferential direction. The, the rotors are assembled with other parts and, finally, its outer peripheral surface including the magnetic poles 8a, 8b is fixedly and hermetically sealed by the pressure case 7. FIG. 5 shows an exploded view showing thus constituted rotor (without showing the pressure case 7) when seen from the outside.

A reference numeral 21 denotes a lead portion introducing a cable 22 into the pressure case 1. The cable 22 supplies electric current to the armature coil 3 from an outside source. A reference numeral 23 denotes a filling of porous mineral having relatively high heat conduction and good insulation properties which is filled in the empty space in the pressure case 1 of the stator. By this filling 23 the coil edges are fixed.

By the way, the amount of this filling 23 can be reduced to a minimum amount required to fix the coil edges, and in such a case, remaining empty space can be filled with gas such as an argon, etc. A reference numeral 24 denotes a gap between the can 6 of the stator and the pressure case 7 of the rotor. Moreover, the center ring 2b and the clampers 2c are provided slots, and the openings of the slots are covered with the slot pieces 4.

First of all, the rotor will be explained. The rotor is constituted by the elements having reference numerals 1-6, and 23. The armature iron core is manufactured by pure thin steel plates (for example, 1 to 2 mm in thickness, desirably 1.5 mm) having stable magnetic performance in high temperature environments. The iron core is formed with slots, and its surfaces are coated by aluminum ceramics (for example, 10 to 50 $\mu$m, desirably 25 $\mu$m) having stable insulation performance in high temperature environments. The armature coil 3 is inserted in the slots. The armature coil 3 is processed by coating it with mineral insulation material having stable insulation performance in high temperature environments.

An opening portion of the slot is closed by the slot piece 4 of ceramics having high mechanical stiffness in the condition that the slot piece 4 contacts with the can 6. That is, water pressure applied on the can 6 is transmitted through the slot piece 4 to the iron core, therefore, the can 6 and the iron core bear together against the water pressure.

The component members holding the armature iron core 2 such as the center ring 2b, the clampers 2c, and 2d the back-up sleeve 5, the can 6, and the pressure case 1 and so on are manufactured by high nickel alloy (for example, Inconel 625 alloy manufactured by Inco Co., Ltd) having substantially the same linear expansion coefficient as pure iron of the piled-up iron core. The armature iron core 2 piled-up and having an adequate number of the center rings 2b is fixed at its outer surface by line welding in a sandwiched condition by means of clampers 2c. The back-up sleeve 5 has sufficient thickness bearing outer pressure in high temperature environment. This back-up sleeve 5 is installed in such a manner that it is supported at both ends of the inner surface of the stator by the clampers 2c and the side plate 1b of the pressure case 1.

The can 6 is inserted inside the inner surface of thus constituted stator, and the edge portion of the can 6 is fixedly welded to the pressure case 1 so as to constitute a pressure container. By selecting linear expansion coefficients of all the constitution material to be substantially the same value, thermal stress generated in the stator structure under high temperature environment can be most suppressed.

Next, the constitution of the armature coil 3 with surfaces covered by mineral insulation material will be explained. Conduction material is selected from silver or nickel plating copper having superior conductivity and resistance to oxidation and deterioration. The insulating layer is formed by winding a wire the armature coil 3. This wire consists of a lower layer of insulation coating material including silicone resin and silica and aluminum fine powder and an upper layer of a layer including mineral fiber (i.e. aluminum long fiber or E-glass long fiber) transversely wound around thereon. In this case, a mineral insulation sheet of aluminum long fiber or E-glass long fiber is wound to be inserted not only between the armature coil 3 and the armature iron core 2 but between the armature coil 3 and the slot piece 4.

This mineral insulation sheet can be made by mineral insulation coating material processed in advance consisting of silicone resin and silica and aluminum fine power (that is, a similar composition to the lower insulation body of conductor). The stator is installed by inserting the armature coil in the slot of iron core.

Next a preliminary baking process will be explained. The purpose of the preliminary baking is to apply ceramic to the armature coil 3 of the installed stator and to remove remaining organic components and water. This preliminary baking facilitates, subsequent impregnation work. The preliminary baking in an electric high temperature furnace is carried out as follows. Temperature is stepwise increased from 80 degrees centigrade to 400 degrees centigrade by amount of 20 to 40 degrees centigrade by keeping temperature balance throughout. Then, the temperature is held at 400 degrees centigrade for a predetermined period of time and, in turn, cooled down naturally in the furnace.

The installed stator is, after having finished preliminary baking, impregnated with the mineral insulation coating material consisting of the silicone resin, the silica, and the aluminum fine powder. The stator having been impregnated with the mineral insulation coating material is then subjected to a main baking in an explosion-proof type high temperature furnace in the same way as the preliminary baking up to 400 degrees centigrade, and subsequently cooled down naturally.

With this main baking, the mineral insulation coating material having impregnated into every corner of the stator can be perfectly turned into a ceramic state, so that a heat resistant insulation system for motors is accomplished. This heat resistant insulation system can provide long-lasting stable electric insulation performance in high temperature environments such as 400 degrees centigrade considering circumferential temperature of 330 degrees centigrade around the motor in addition to heat generation due to electric current supply to the armature coil 3.

Finally, constitution of the rotor is explained. The magnetic pole of the rotor is manufactured of a samarium cobalt magnetic having higher curie temperature and larger coercive force since it is subjected to a high temperature environment of approximately 330 degrees centigrade for fairly long periods of time. However, a high temperature non-reversible magnetic reduction phenomenon cannot be avoided wherein the permanent magnetic 8 gradually loses its coercive force due to continuous usage for fairly long period of time in a high temperature environment.

Therefore, the motor shown in FIG. 1 is designed to have a lower magnetic field inside the permanent magnet 8 by forming the permanent magnet 8 in a long shape extending in its magnetizing direction, thereby moderating the high temperature non-reversible magnetic reduction phenomenon. However, even in the motor shown in FIG. 1, it will be found that the permanent magnet loses its magnetic force for a long time. Therefore, the electromagnetic design is carried out in such a manner that motors can perform their function even if the magnetic flux density is reduced to a level of 60%.

Then, while the high temperature non-reversible magnetic reduction phenomenon proceeds, it is assumed that magnetization distribution will be changed from an initial condition in which it was symmetrical in a circumferential direction to the condition such that it becomes non-symmetrical due to symmetrical advance of the high temperature non-reversible magnetic reduction phenomenon. Such a non-symmetrical magnetized distribution torque rippled in motors, which is the so-called coging torque.

Accordingly, in the motor shown in FIG. 1, the rotor magnetic pole is divided into two parts in its axial direction. Each of rotor magnetic poles is disposed to offset with respect to the other in a half slot pitch circumferential direction of the rotor. Thus, torque ripple due to non-symmetrical magnetization distribution will be canceled. Furthermore, the permanent magnet 8 is covered and hermetically sealed by the pressure case 7, etc. to prevent the permanent magnet 8 from directly contacting water, thereby suppressing deterioration of the permanent magnet 8. The pressure case 7 acts as a means for fixing the magnet to the magnetic yoke.

The stator and the rotor of the motor are both subjected to high temperature and high pressure water in pressure containers of nuclear reactors in such a manner that their surrounding portions are covered by the high temperature and high pressure water. Moreover, there various heat generations will occur such as Joule heating due to resistance of the armature coil 3 and armature electric current, heat generation due to core loss caused by magnetic flux of the armature iron core 2, and heat generation due to eddy current loss caused in the can 6 when the magnetic flux of the permanent magnet of rotor penetrates the can 6 of the stator. Therefore, the temperature of the stator will become higher than that of surrounding high temperature and high pressure water.

For this reason, in view of design purposes, the temperature of the armature coil when the maximum electric current is supplied, is normally supposed to reach 410 degrees centigrade by assuming a maximum increase of 80 degrees centigrade from the surrounding high temperature and high pressure water temperature of 330 centigrade. Further, the armature coil 3 contacts the armature iron core 2, and the armature iron core 2 contacts the pressure case 1, and the pressure case 1 is covered by high temperature and high pressure water.

Therefore, heat generation in the rotor is naturally transferred to the surrounding high temperature and high pressure water by virtue of temperature gradient among these components. To the contrary, the rotor does not cause heat generation since no electric current is supplied, but is surrounded by the high temperature and high pressure water in the same way as the stator, so that it is maintained at the same approximately 330 degrees centigrade as surrounding high temperature and high pressure water.

Furthermore, the inside pressure of the space 25 of the can 6 is maintained to be equal to outer pressure of the motor to prevent high temperature water from entering through the bearings 14a, 14b into the space 25.

Though the above embodiment is explained by showing the motor for actuating control rods installed in a pressure container of nuclear reactor, the motor based on the constitution in accordance with the present invention can be used for other high temperature/high pressure type motor applications such as a power source for robots preventing disasters used at the base of active volcanoes, or a power source for robots working at high temperature underground or sea bottom locations. In such cases, transverse type motors are of course acceptable though the above embodiments are vertical type motors.

As is revealed in the foregoing description, in accordance with a first aspect of the present invention, there is provided a heat resistant and explosion-proof type permanent magnetic synchronous motor which comprises; a stator including an armature iron core made by piling up steel plates with surface covered with a mineral insulation material and disposed on an inner peripheral surface of a pressure case, an armature coil by winding a wire covered by with a mineral insulation material around a slot of the armature iron core, a can hermetically sealing the armature iron core, a back-up sleeve supporting the can at a portion where the armature iron core is not provided, and a slot piece of a mineral insulation material supporting the can at an opening portion of the slot. The motor also includes a rotor including a magnetic yoke connected to an outer peripheral surface of an actuating shaft provided to penetrate the pressure case and rotatably supported thereon, a plurality of rotor magnetic poles disposed on an outer peripheral surface of the magnetic yoke, and a non-metallic case covering an outer peripheral surface of the rotor magnetic pole.

With this arrangement, it becomes possible to provide a heat resistant and explosion-proof type permanent magnetic synchronous motor capable of being installed in high temperature and high pressure environments. For example, a heat resistant and explosion-proof type permanent magnetic synchronous motor capable of being installed in a pressure container of nuclear reactor at temperatures near 330 degrees centigrade and pressures approximately 100 times atmospheric pressure for the purpose of actuating control rods for a pressurized water type nuclear reactor. Therefore, it becomes possible to install the control rod actuating apparatus inside of the pressure container of nuclear reactor. In other words, it is not necessary to install the control rod actuating apparatus outside of the pressure container. As a result of this design change, complicated structures for supporting the control rod actuating apparatus provided out of the pressure container become unnecessary, so that the nuclear reactor can be made compact in size and light in weight. Furthermore, possibility of accidents occurring when control rods fly out can be reduced to zero.

Moreover, in accordance with a second aspect of the heat resistant and explosion-proof type permanent magnetic synchronous motor of the present invention, the rotor magnetic pole is divided into a plurality of poles in an axial direction, and the rotor is constituted by disposing this divided plurality of rotor magnetic poles on the magnetic yoke so as to offset each other in a circumferential direction. Therefore, even when high temperature non-reversible magnetic reduction phenomenon of permanent magnetic performance advances non-symmetrically, it becomes possible to maintain continuous generation of torque having no ripple for fairly long period of time.

Still further, in accordance with third aspect of the heat resistant and explosion-proof type permanent magnetic synchronous motor of the present invention, the armature iron core is made of pure steel plate. Therefore, the magnetic performance at high temperatures is well maintained. That is, magnetic permeability is good and stabilized even at high temperatures compared with normal temperature, thus hysteresis loss becomes small. Pure iron has a relatively small resistance value and has a large eddy current loss, however to the contrary, the pure iron has a relatively large resistance value and has a small eddy current loss. Also, the surface of the pure steel plate is coated with heat resistant ceramics through melt injection as an electrical insulation. Since this ceramics coating lasts for a long period of time, the pure steel plate can have a stable high insulation resistance even in higher temperature environment.

Yet further, in accordance with a fourth aspect of the heat resistant and explosion-proof type permanent magnetic synchronous motor of the present invention, a plurality of rotor magnetic poles of the same configuration are formed and arranged in a plurality of rows in an axial direction, and a strong center ring is interposed at a portion of the armature iron core which corresponds to an intermediate portion of each of the plurality of rows. Therefore, a strong stator can be obtained by preventing the armature iron core from losing stiffness due to its axially long piled-up configuration.

Moreover, in accordance with a fifth aspect of the heat resistant and explosion-proof type permanent magnetic synchronous motor of the present invention, the component member holding the armature iron core is made of materials having substantially the same coefficient of linear expansion as iron core of pure iron (for example, high nickel alloy). Therefore, breakage need not be a concern even if it is used for fairly long period of time, since thermal stress generated in the stator structure under high temperature environment remains within a small amount.

As this invention may be embodied in several forms without departing from the spirit of its essential characteristics, the described embodiments should be regarded as illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A heat resistant and explosion-proof type permanent magnetic synchronous motor comprising:
   a stator including an armature iron core made by piling up steel plates with surfaces covered with a mineral insulation material and disposed on an inner peripheral surface of a pressure case, an armature coil made by winding a wire covered with a mineral insulation material around a slot of the armature iron core, a can hermetically sealing the armature iron core, a back-up sleeve supporting the can at a portion where the armature iron core is not provided, and a slot piece of a mineral insulation material supporting the can at an opening portion of the slot; and
   a rotor including a magnetic yoke connected to an outer peripheral surface of an actuating shaft provided to penetrate the pressure case and rotatably supported on the pressure case, a plurality of rotor magnetic poles disposed on an outer peripheral surface of the magnetic yoke, a plurality of non-magnetic spacers respectively interposed between respective circumferentially neighboring rotor magnetic poles, and a case covering an outer peripheral surface of the rotor magnetic pole thereby suppressing deterioration of said outer peripheral surface.

2. The heat resistant and explosion-proof type permanent magnetic synchronous motor in accordance with claim 1 in which the rotor magnetic poles disposed on the outer peripheral surface of the magnetic yoke are disposed so as to offset with each other in a circumferential direction.

3. The heat resistant and explosion-proof type permanent magnetic synchronous motor in accordance with claim 1 in which, the armature iron core is made of pure steel plates with surfaces covered by ceramics through melt injection.

4. The heat resistant and explosion-proof type permanent magnetic synchronous motor in accordance with claim 1 in which a plurality of rotor magnetic poles of the same configuration are arranged on an outer peripheral surface of the magnetic yoke in a plurality of rows in an axial direction, and a center ring is interposed at a portion of the armature iron core which corresponds to an intermediate portion of each of the plurality of rows.

5. The heat resistant and explosion-proof type permanent magnetic synchronous motor in accordance with claim 1 in which a portion holding the armature iron core in the pressure case is made of materials having substantially the same coefficient of linear expansion as the armature iron core.

* * * * *